(12) United States Patent
Martinez

(10) Patent No.: US 11,152,140 B2
(45) Date of Patent: Oct. 19, 2021

(54) WIRE HOLDER FOR ASSEMBLING A WIRE HARNESS

(71) Applicant: Gulfstream Aerospace Corporation, Savannah, GA (US)

(72) Inventor: Jose Antonio Martinez, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 204 days.

(21) Appl. No.: 16/280,865

(22) Filed: Feb. 20, 2019

(65) Prior Publication Data

US 2020/0265973 A1 Aug. 20, 2020

(51) Int. Cl.
| | | |
|---|---|---|
| *H01B 13/012* | (2006.01) | |
| *H01B 7/00* | (2006.01) | |
| *B64D 41/00* | (2006.01) | |
| *B60R 16/02* | (2006.01) | |

(52) U.S. Cl.
CPC ..... *H01B 13/01263* (2013.01); *H01B 7/0045* (2013.01); *B60R 16/0207* (2013.01); *B64D 41/00* (2013.01); *B64D 2221/00* (2013.01)

(58) Field of Classification Search
CPC B60R 16/0207; B64D 41/00; B64D 2221/00; H01B 7/0045; H01B 13/01263
See application file for complete search history.

(56) References Cited

FOREIGN PATENT DOCUMENTS

| JP | 10-313523 A | * 11/1998 |
|---|---|---|
| JP | 6382074 B | * 8/2018 |

* cited by examiner

*Primary Examiner* — Carl J Arbes
(74) *Attorney, Agent, or Firm* — LKGlobal | Lorenz & Kopf, LLP

(57) ABSTRACT

Wire holders removably retaining at least one wire for assembling a wire harness and methods for assembling a wire harness are provided. In one example, the wire holder includes a base section having a base bottom for positioning on a wire harness layout sheet. The wire harness layout sheet includes a wire routing pattern for forming the wire harness. A clip section extends generally upwardly from the base section and at least partially surrounds a clip channel having a channel diameter. The base section has a base height defined from the base bottom to a lowest point of the clip channel. A ratio of the channel diameter to the base height is from about 6:1 to about 9:1.

16 Claims, 4 Drawing Sheets

WIRE HOLDER FOR ASSEMBLING A WIRE HARNESS

TECHNICAL FIELD

The technical field relates generally to assembly of a wire harness, and more particularly, relates to a wire holder used as an aid for holding or otherwise removably retaining wires for assembling a wire harness that, for example, is to be installed in an aircraft or other vehicle, and a method for assembling a wire harness using such a wire holder.

BACKGROUND

Aircrafts and other vehicles, for example, employ wire harnesses that include a plurality of wires for providing electrical communication between the various electronic components, vehicle devices and/or the like. Because of the many wires and complexity of routing these wires, assembling wire harnesses can be a labor-intensive process requiring relatively long cycle times for fabricating the wire harness. As such, it is important that a process for assembling wire harnesses be relatively efficient and ergonomically friendly to minimize, reduce, or limit cycle times.

Further, often the package space for stowing wire harnesses within the vehicle is limited and/or complex involving multiple twisting and/or winding passageways. Thus, a process for assembling wire harnesses should produce relatively high-quality parts that are dimensionally accurate, so the wire harnesses properly fit as intended within the vehicle structure.

To assist production personnel during assembly of wire harnesses, a plurality of spaced apart wire holders can be used to hold the wires above and aligned with a wire routing pattern that is displayed on a blueprint (e.g., also referred to as a mylar) so that the wires can be properly routed per design intent. One such wire holder is a tie mount that includes a tie down with two straps. During assembly of the wire harness, the tie mounts are positioned along the wire routing pattern displayed on the mylar, and a production worker position one or more wires between the two straps of each of the tie downs, then couples the straps together and pulls one of the straps to tighten the tie down around the wire bundle. When the wire harness is completed, each of the tie downs need to be cut or otherwise manually disengaged to release the wire harness for subsequent installation into an aircraft or other vehicle structure. Unfortunately, this approach is relatively inefficient and ergonomically unfriendly due to the labor intensity of coupling and decoupling the numerous tie downs.

Another such wire holder is a clip mount that includes a clip that is positioned on about a one-inch tall mounting bracket. During assembly of the wire harness, the clip mounts are positioned along the wire routing pattern displayed on the blueprint, and a production worker position one or more wires into the clips. When the harness is completed, the wire bundles can be removed from each of the clips of the clip mounts to release the wire harness for eventual installation into an aircraft or other vehicle structure. Unfortunately, this approach results in a relatively lower quality wire harness because the distance between the wire bundles and the mylar is about an inch or greater, and this distance can negatively impact the overall tolerance of the wire harness, potentially resulting in a wire harness that does not properly fit into the aircraft or other vehicle structure.

Accordingly, it is desirable to provide wire holders for efficient and/or ergonomically friendly assembly of wire harnesses that have relatively good quality, and methods for assembling wire harnesses using such wire holders. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a wire holder for removably retaining at least one wire for assembling a wire harness, and various non-limiting embodiments of a method for assembling a wire harness, are provided herein.

In a first non-limiting embodiment, the wire holder includes, but is not limited to, a base section having a base bottom for positioning on a wire harness layout sheet. The wire harness layout sheet includes a wire routing pattern for forming the wire harness. The wire holder further includes, but is not limited to, a clip section for removably retaining the at least one wire. The clip section extends generally upwardly from the base section and at least partially surrounds a clip channel having a channel diameter. The base section has a base height defined from the base bottom to a lowest point of the clip channel. A ratio of the channel diameter to the base height is from about 6:1 to about 9:1.

In another non-limiting embodiment, the method includes, but is not limited to, positioning a base bottom of a base section of a wire holder along a wire routing pattern that is disposed on a wire harness layout sheet. The method further includes, but is not limited to, inserting a first wire into a clip channel of a clip section of the wire holder. The clip channel has a channel diameter and the base section of the wire holder has a base height defined from the base bottom to a lowest point of the clip channel. A ratio of the channel diameter to the base height is from about 6:1 to about 9:1.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to wire holders for removably retaining one or more wires for assembling a wire harness, and methods for assembling wire harnesses. The wire holder includes a base section having a base bottom for positioning on a wire harness layout sheet. The wire harness layout sheet includes a wire routing pattern for forming the wire harness. The wire holder includes a clip section for removably retaining the one or more wires. The clip section extends generally upwardly from the base section and at least partially surrounds a clip channel. The clip channel has a channel diameter that is sized to hold the one or more wires for forming the wire harness. The base section has a base height defined from the base bottom to a lowest point of the clip channel. In an exemplary embodiment, the base height is relatively small or minimal in relation to the channel diameter. In one example, a ratio of the channel diameter to the base height is from about 6:1 to about 9:1.

In an exemplary embodiment, the clip section is configured to allow the one or more wires to be quickly and easily inserted into the clip channel for forming the wire harness. Likewise, the clip section is configured to allow the one or more wires to be quickly and easily removed from the clip channel to release the wire harness from the wire holder. As such, the wire holder facilitates efficient and ergonomically friendly assembly of the wire harnesses. Moreover, in an exemplary embodiment, because the base height of the base section is relatively small or minimal in relation to the channel diameter, the distance between the one or more wires disposed in the clip channel and the wire routing pattern on the wire harness layout sheet is minimal, improving the dimensional accuracy and overall tolerance of the wire harness to properly fit into an aircraft or other vehicle structure.

Figure 1:
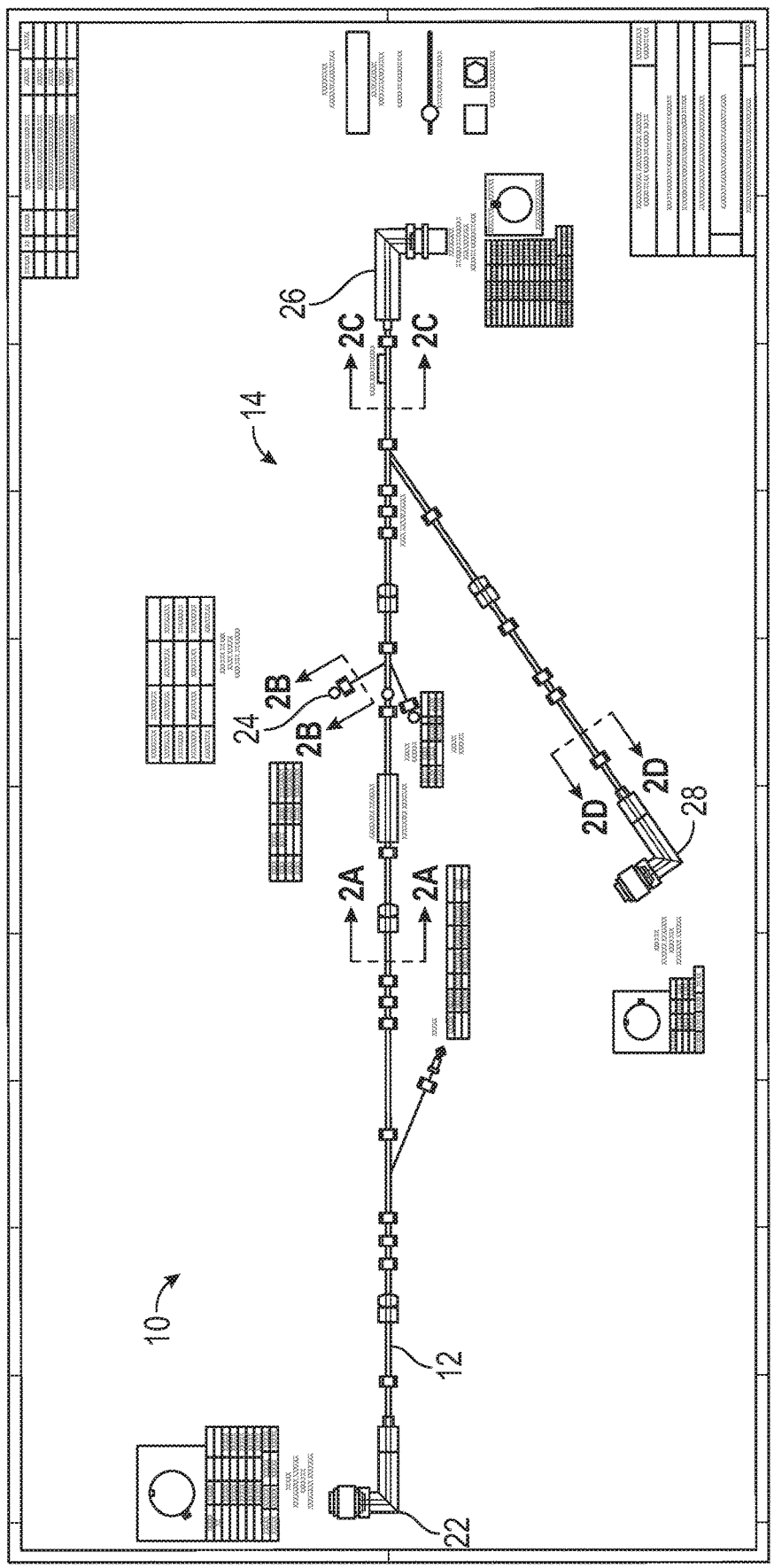
FIG. 1 illustrates a top view of a wire harness layout sheet including a wire routing pattern for a wire harness in accordance with an exemplary embodiment.
Figure 2A:
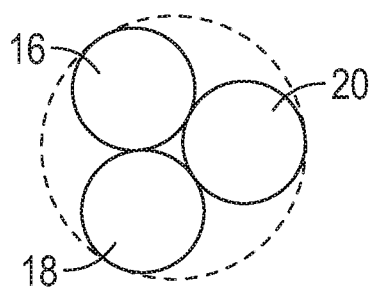
FIG. 2A illustrates a cross-sectional view of wires for the wire harness schematically represented in FIG. 1 along line 2A-2A.
Figure 2B:
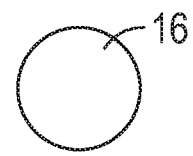
FIG. 2B illustrates a cross-sectional view of a wire for the wire harness schematically represented in FIG. 1 along line 2B-2B.
Figure 2C:
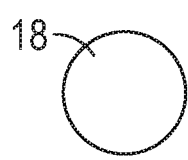
FIGS. 2C-2D illustrate cross-sectional views of a wire for the wire harness schematically represented in FIG. 1 along lines 2C-2C and 2D-2D, respectively.
Figure 2D:
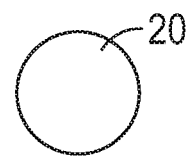

FIG. 1 illustrates a top view of a wire harness layout sheet 10 including a wire routing pattern 12 for a wire harness 14 (schematically illustrated) in accordance with an exemplary embodiment. FIGS. 2A-2D illustrates cross-sectional views of wires 16, 18, and 20 (schematically illustrated) for the wire harness 14 represented in FIG. 1 along lines 2A-2A, 2B-2B, 2C-2C, and 2D-2D, respectively. The wire harness layout sheet 10, also commonly referred to as a blueprint or mylar, is a technical drawing produced, for example, by a computer aided design (CAD) draftsperson in an electrical design department. The wire harness layout sheet 10 includes the routing for the wires 16, 18, and 20, defining at least in part the wire routing pattern 12. The wire routing pattern 12 may be drawn to scale, such as a 1:1 scale, or any other desired scale. In an exemplary embodiment, the schematic representation of the wire harness 14 including wire routing pattern 12 is drawn to a 1:1 scale.

Although the wire harness 14 is illustrated as having 3 wires 16, 18, and 20, it is understood to those skilled in the art that the wire harness 14 may include less than 3 wires but at least 1 wire, or more than 3 wires depending upon the specific design of the wire harness 14. As illustrated, the wire harness 14 has 3 wires 16, 18, and 20 that extend from a connector 22 and branch off and/or are otherwise routed to various other connectors 24, 26, and 28.

Figure 3:
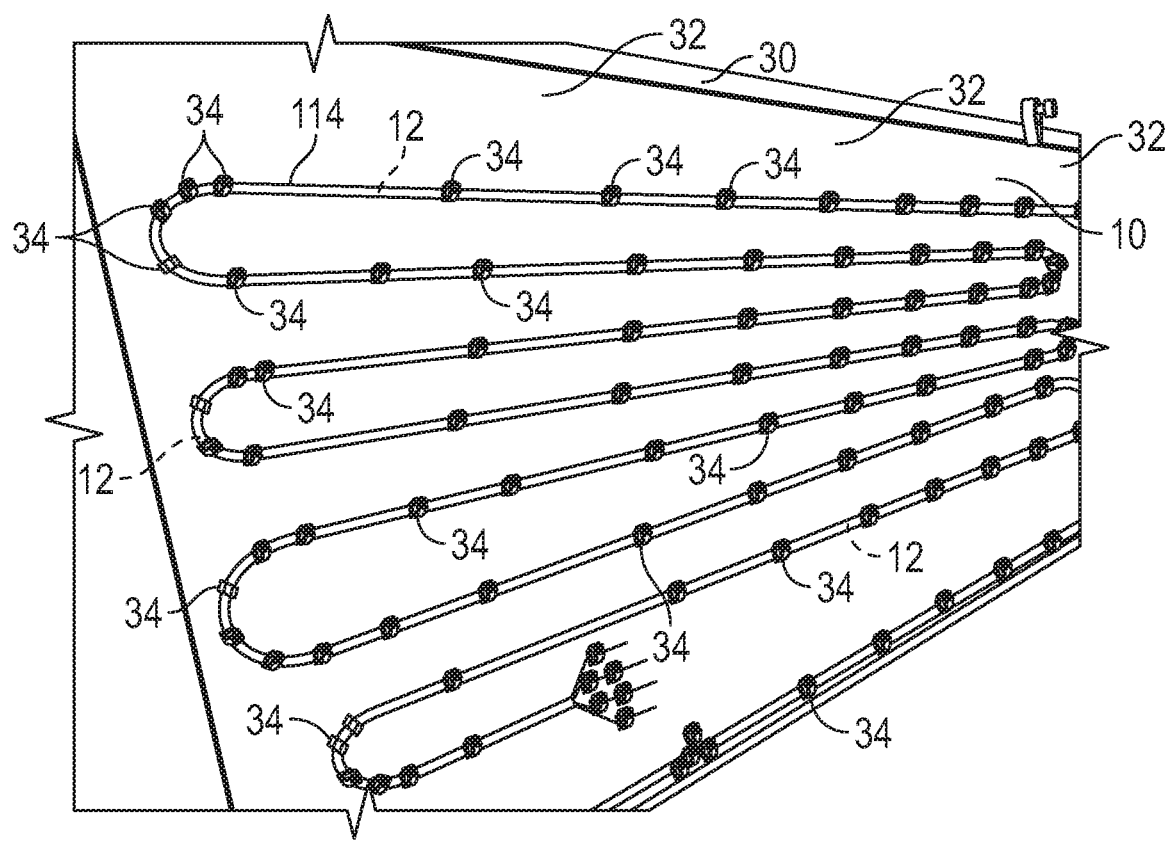
FIG. 3 illustrates a perspective view of a wire harness layout sheet mounted on a board and a plurality of wires held in wire holders along a wire routing pattern in accordance with an exemplary embodiment.

Referring to FIG. 3, in an exemplary embodiment, the wire harness layout sheet 10 is mounted to a board 30 via fasteners 32 or other fixing devices or the like. As illustrated, the board 30 is positioned substantially upright so that one or more production workers can easily use the wire harness layout sheet 10 including the wire routing pattern 12 as a template for forming a wire harness 114.

Figure 5:
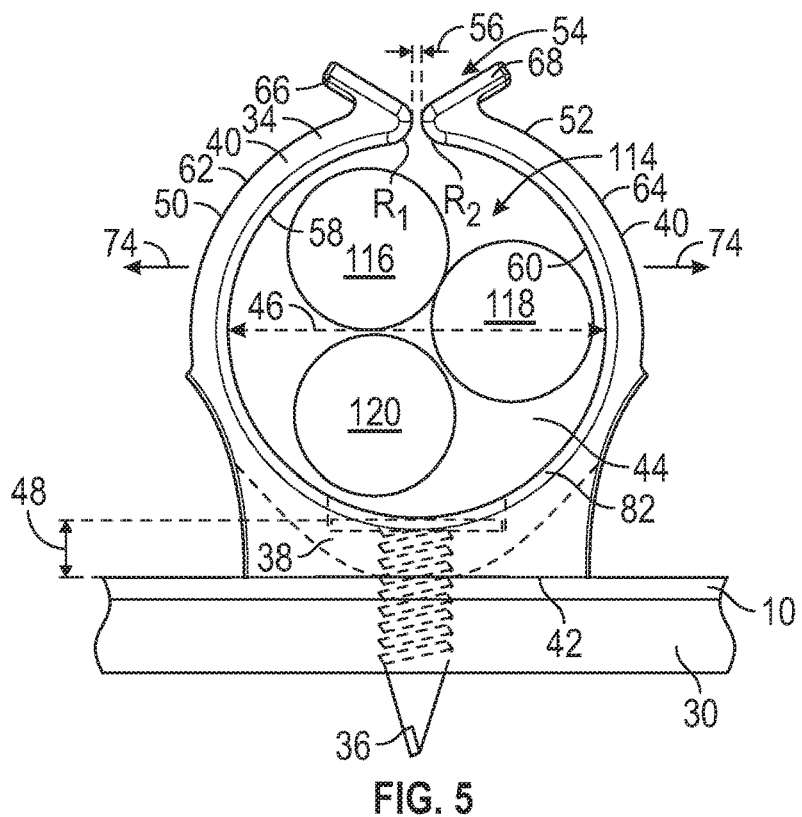
FIG. 5 illustrates a front view of a wire holder holding a plurality of wires and positioned on a wire harness layout sheet that is supported by a board in accordance with an exemplary embodiment.
Figure 6:
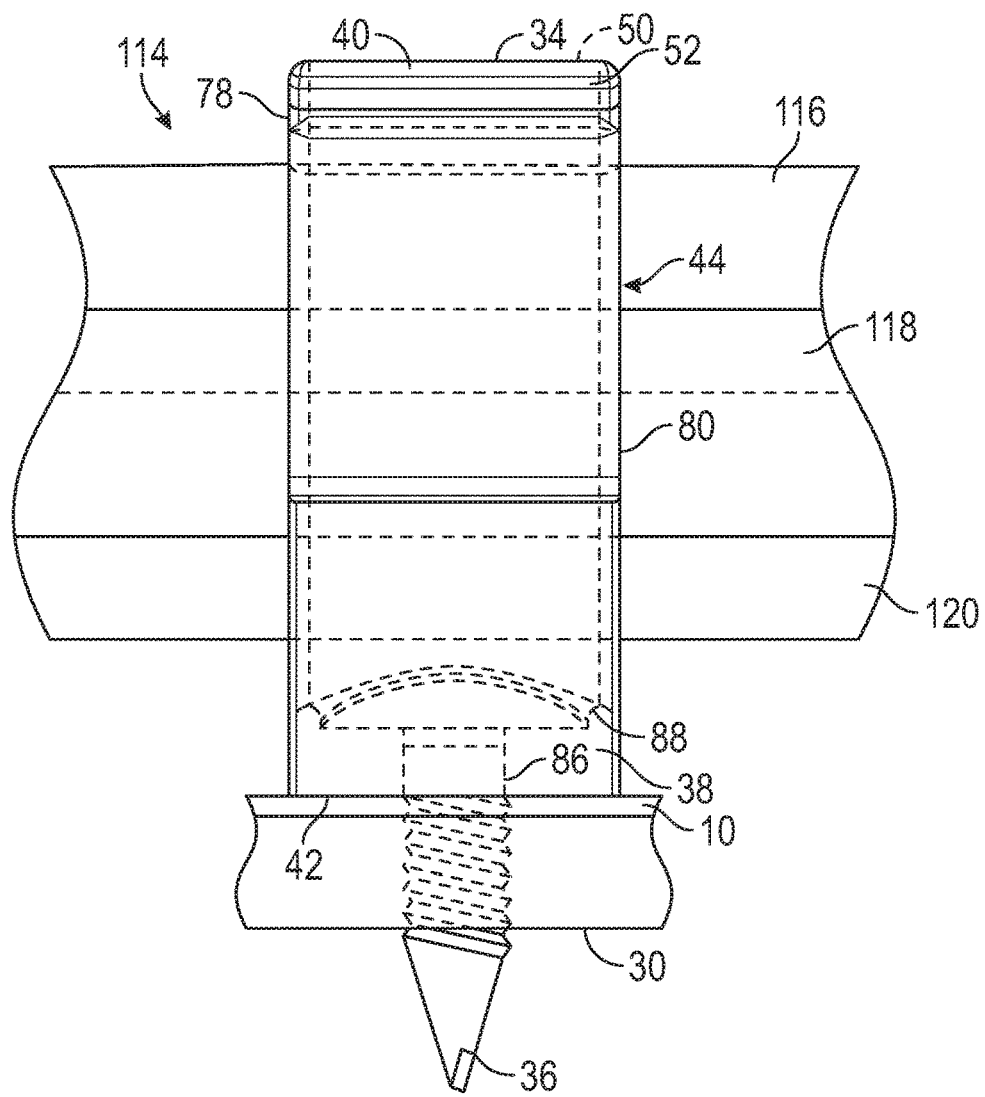
FIG. 6 illustrates a side view of a wire holder holding a plurality of wires and positioned on a wire harness layout sheet that is supported by a board in accordance with an exemplary embodiment.

Referring also to FIGS. 5-6, in an exemplary embodiment, a plurality of spaced apart wire holders 34 are positioned on the wire harness layout sheet 10 along the wire routing pattern 12. As will be discussed in further detail below, a fastener 36 is coupled to each of the wire holders 34 and extends through the wire harness layout sheet 10 into the board 30 such that the wire holders 34 are mounted to the board 30 with the wire harness layout sheet 10 sandwiched therebetween.

Figure 4:
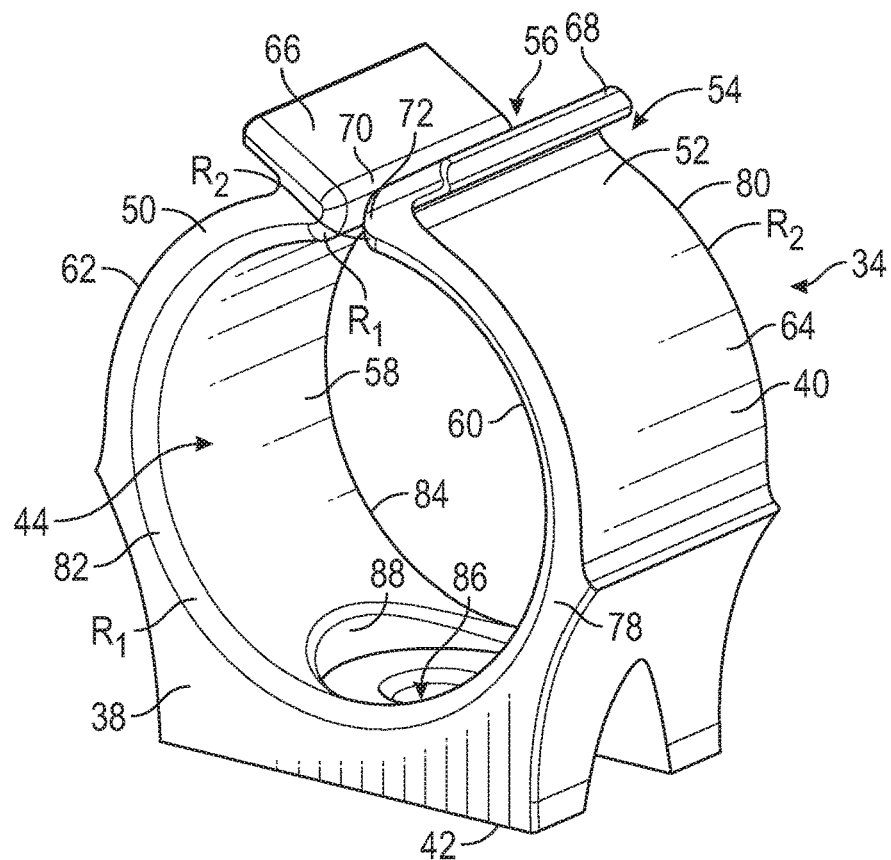
FIG. 4 illustrates a perspective view of a wire holder in accordance with an exemplary embodiment.

Referring to FIGS. 4-6, in an exemplary embodiment, each of the wire holders 34 include a base section 38 and a clip section 40. The base section 38 has a base bottom 42 for positioning on the wire harness layout sheet 10 aligned with and overlying, for example, the wire routing pattern 12 (shown in FIGS. 1-2).

As will be discussed in further detail below, the clip section 40 is configured for removably retaining the wires 116, 118, 120, of the wire harness 114, which are aligned with and overlie the correspond to wires 16, 18, and 20 of the wire routing pattern 12. The clip section 40 extends generally upwardly from the base section 38 and at least partially surrounding a clip channel 44. The clip channel 44 has a channel diameter (indicated by double headed dashed arrow 46) that is sized to hold the wires 116, 118, 120.

The base section 38 has a base height (indicated by double headed arrow 48) defined as the distance from the base bottom 42 to a lowest point of the clip channel 44. In an exemplary embodiment, the base height is relatively small or minimal in relation to the channel diameter 46, defining a ratio of the channel diameter 46 to the base height 48 of from about 6:1 to about 9:1, for example from about 6.25:1 to about 8.25:1. In an exemplary embodiment, the base height 48 is from about 0.1 to about 0.25 inches and the channel diameter 46 is from about 0.8 to about 1.6 inches.

As illustrated, in an exemplary embodiment, the clip section 40 includes arcuate clip arms 50 and 52 that are spaced apart from each other and that extend generally upward from the base section 38 to form an open ring 54. As will be discussed in further detail below, at the upper portion of the open ring 54 is a gap 56 that allows the wires 116, 118, and 120 to be inserted therethrough into the clip channel 44, and likewise to be removed from the clip channel 44.

The arcuate clip arms 50 and 52 have concave inner surface 58 and 60 facing the clip channel 44 and convex outer surfaces 62 and 64 opposite the concave inner surfaces 58 and 60. In an exemplary embodiment, disposed at the upper sections of the arcuate clip arms 50 and 52 are distal lead-in end portions 66 and 68. The distal lead-in end portions 66 and 68 taper inwardly towards each other to facilitate directing the wires 116, 118, 120 through the gap 56 for insertion into the clip channel 44. In an exemplary embodiment, the distal lead-in end portions taper inwardly at an angle of from about 20 to about 45°, for example about 30°.

As illustrated, the arcuate clip arms 50 and 52 have radius surfaces 70 and 72 defined by radius $R_1$ and $R_2$ between the distal lead-in end portions 66 and 68 and the concave inner surfaces 58 and 60. Advantageously, in an exemplary embodiment, the radius surfaces 70 and 72 help prevent any damage to the wires 116, 118, 120 as they pass through the gap 56. In an exemplary embodiment, $R_1$ and, independently, $R_2$ are from about 0.01 to about 0.03 inches.

In an exemplary embodiment, the arcuate clip arms 50 and 52 are flexible and biased towards a nominal condition (as illustrated in FIG. 5) in which the gap 56 is smaller than the diameter of the wires 116, 118, and 120 to retain the wires 116, 118, and 120 in the clip channel 44. The arcuate clip arms 50 and 52 can be flexed or otherwise bent outwardly (indicated by arrows 74) for movement from the nominal condition to an expanded condition to increase the size of the gap 56 to greater than the diameter of the wires 116, 118, and 120 for inserting and/or removing the wires 116, 118, and 120 from the clip channel 44. In an exemplary embodiment, when the arcuate clip arms 50 and 52 are in the nominal condition, the distal lead-in end portions 66 and 68 are spaced apart from each other to define the gap 56 as from about 0.02 to about 0.04 inches. In an exemplary embodiment, the wire holder 34 is formed of a flexible material comprising a plastic material, a polymeric material, and/or an elastomeric material.

As illustrated, the wire holder 34 has opposing transverse surfaces 78 and 80 that extends across the base section 38 and the clip section 40. In an exemplary embodiment, the wire holder 34 has a thickness defined as a distance between transverse surfaces 78 and 80 of from about 0.4 to about 0.75 inches. The wire holder 34 has radius surfaces 82 and 84 defined by radius $R_1$ and $R_2$ between the transverse surfaces 78 and 80 and the concave inner surfaces 58 and 60. In an exemplary embodiment, the radius $R_1$ and, independently, $R_2$ of the radius surfaces 82 and 84 are from about 0.01 to about 0.03 inches.

As discussed above, a fastener 36 is used to mount the wire holder 34 on the wire harness layout sheet 10. As illustrated, the base section 38 of the wire holder 34 has a hole 86 formed therethrough for receiving the fastener 36. A pocket 88 surrounds the hole 86 for retaining the wire holder 34 to the fastener 36 when mounted on the wire harness layout sheet 10.

Figure 7:
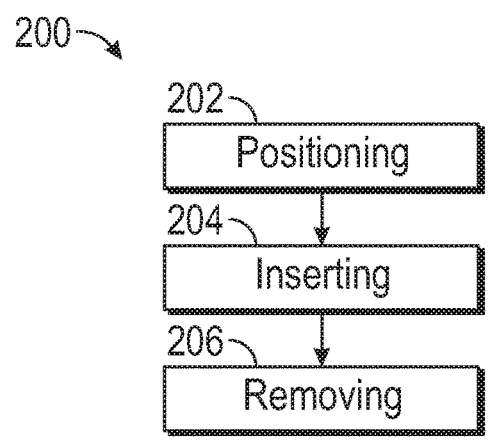
FIG. 7 illustrates a method for assembling a wire harness in accordance with an exemplary embodiment.

Referring to FIG. 7, a method 200 for assembling a wire harness is provided. The method 200 includes positioning (STEP 202) a base bottom of a base section of a wire holder along a wire routing pattern that is disposed on a wire harness layout sheet. One or more wires (e.g., wire bundle) are inserted (STEP 204 into a clip channel of a clip section of the wire holder. The clip channel has a channel diameter and the base section of the wire holder has a base height defined from the base bottom to a lowest point of the clip channel. A ratio of the channel diameter to the base height is from about 6:1 to about 9:1, for example from about 6.25:1 to about 8.25:1. The one or more wires (e.g., wire bundle) is removed (STEP 206) from the clip channel.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A wire holder for removably retaining at least one wire for assembling a wire harness, the wire holder comprising:
   a base section having a base bottom for positioning on a wire harness layout sheet that includes a wire routing pattern for forming the wire harness; and
   a clip section for removably retaining the at least one wire, the clip section extending generally upwardly from the base section and at least partially surrounding a clip channel having a channel diameter, wherein the base section has a base height defined from the base bottom to a lowest point of the clip channel, and wherein a ratio of the channel diameter to the base height is from about 6:1 to about 9:1.

2. The wire holder of claim 1, wherein the ratio of the channel diameter to the base height is from about 6.25:1 to about 8.25:1.

3. The wire holder of claim 1, wherein the base height of the base section is from about 0.1 to about 0.25 inches.

4. The wire holder of claim 1, wherein the channel diameter of the clip channel is from about 0.8 to about 1.6 inches.

5. The wire holder of claim 1, wherein the clip section comprises a first arcuate clip arm and a second arcuate clip arm that are spaced apart from each other and that extend generally upward from the base section to form an open ring.

6. The wire holder of claim 5, wherein the first arcuate clip arm has a first concave inner surface facing the clip channel and a first convex outer surface opposite the first concave inner surface, wherein the second arcuate clip arm has a second concave inner surface facing the clip channel and a second convex outer surface opposite the second concave inner surface.

7. The wire holder of claim 6, wherein the wire holder has a first transverse surface that extends across the base section and the clip section and a second transverse surface that is opposite the first and that extends across the base section and the clip section, and wherein the wire holder has a thickness defined from the first transverse surface to the second transverse surface.

8. The wire holder of claim 7, wherein the thickness is from about 0.4 to about 0.75 inches.

9. The wire holder of claim 7, wherein the wire holder has a first radius surface defined by a first radius $R_1$ between the first transverse surface and the first and second concave inner surfaces, and a second radius surface defined a second radius $R_2$ between the second transverse surface and the first and second concave inner surfaces, and wherein $R_1$ and, independently, $R_2$ are from about 0.01 to about 0.03 inches.

10. The wire holder of claim 6, wherein the first arcuate clip arm has a first distal lead-in end portion and the second arcuate clip arm has a second distal lead-in end portion, and wherein the first and second distal lead-in end portions taper inwardly towards each other.

11. The wire holder of claim 10, wherein the first arcuate clip arm has a first radius surface defined by a first radius $R_1$ between the first distal lead-in end portion and the first concave inner surface, and the second arcuate clip arm has a second radius surface defined by a second radius $R_2$ between the second distal lead-in end portion and the second concave inner surface, and wherein $R_1$ and, independently, $R_2$ are from about 0.01 to about 0.03 inches.

12. The wire holder of claim 10, wherein the first and second distal lead-in end portions are spaced apart from each other to define a gap of from about 0.02 to about 0.04 inches.

13. The wire holder of claim 5, wherein the first and second arcuate clip arms are biased towards a nominal condition for retaining the at least one wire in the clip channel and are configured to allow movement from the nominal condition to an expanded condition for one of inserting the at least one wire into the clip channel and removing the at least one wire from the clip channel.

14. The wire holder of claim 13, wherein the wire holder is formed of a flexible material selected from a plastic material, a polymeric material, and an elastomeric material.

15. The wire holder of claim 1, wherein the base section has a hole formed therethrough for receiving a fastener for mounting the wire holder on the wire harness layout sheet.

16. The wire holder of claim 15, wherein the base section has a pocket surrounding the hole for retaining the wire holder to the fastener when mounted on the wire harness layout sheet.

\* \* \* \* \*